Patented Sept. 6, 1932

1,875,447

UNITED STATES PATENT OFFICE

CLARENCE W. HANCOCK AND EDWIN H. CARNARIUS, OF PEORIA, ILLINOIS, ASSIGNORS TO COMMERCIAL SOLVENTS CORPORATION, OF TERRE HAUTE, INDIANA, A CORPORATION OF MARYLAND

ESTERIFICATION PROCESS

No Drawing.    Application filed January 2, 1930.   Serial No. 418,153.

This invention relates to improvements in the manufacture of esters. More specifically, this invention relates to improvements in the method of neutralizing the reaction mixture at the completion of the esterification process, and prior to the recovery of the products.

As is well known to the art, there are a number of esters such as butyl acetate, butyl propionate, iso-butyl acetate, amyl iso-butyrate, etc., whose boiling ranges are relatively close to the boiling ranges of the corresponding acids. In the manufacture of these esters by direct esterification of the free acid, neutralization is necessary before the final distillation, for even an exceptionally efficient column will not completely separate the acid and ester.

In the past, the neutralization processes which have been used have had certain inherent disadvantages which are overcome by the use of this new and improved process. Previously, it has been the custom to pump the reaction mixture from the esterification kettle into a neutralizing tank where an alkaline material such as soda ash is added. Lime has never been found to be satisfactory, using this process. Neutralization by this method takes from six to eight hours with constant agitation, and involves a considerable loss of heat. The neutralized mixture is then pumped to a refining still, where the ester is recovered. It is seen that dual equipment is necessitated, that a relatively expensive neutralizing agent is used, and that losses of time, heat, power and material are involved.

This invention consists essentially in the neutralization of the reaction mixture in the esterification kettle, while hot, using a small fraction of the reaction mixture to carry the neutralizing agent. By the use of this process, lime may be employed rather than the more expensive neutralizing agents. That the use of this improved method obviates the above-mentioned disadvantages of the previous methods may best be illustrated by the following example:

Butanol and acetic acid are charged into an esterification kettle in approximately the proportion of 5.2 pounds of butanol to 3.67 pounds of acetic acid. Approximately 0.1% sulphuric acid is used as a catalyst. The kettle is equipped with an efficient column, dephlegmator, condenser, and separator. The return flow from the dephlegmator is controlled so that part or all may be returned to the top of the column as reflux, or may be run directly to the tail box and separator. The separator is of the gravity-decantation type for the separation of immiscible liquids. The charge is then heated, and the butanol-butyl acetate constant-boiling mixture with water is boiled off as rapidly as possible. During this process, the return flow from the dephlegmator is directed to the tail box and separator, and the butyl acetate layer is returned to the kettle from the separator. When the temperature of the liquid at the middle of the column reaches 212° to 217° F., the reflux from the dephlegmator is returned to the column. Fractionation then proceeds until no more water may be separated, and at this point the esterification is complete, and the ester is substantially dry. A fraction of the reaction mixture, usually about 1.5%, is then pumped, while hot, to a mixing tank where the calculated amount of lime is added and thoroughly suspended in the liquid by agitation. For a 22,000 gallon charge, about 300 gallons of the reaction mixture are used for the neutralization. Obviously, the amount of lime or other neutralizing agent for each charge will vary, depending on the amount of acid remaining after the esterification, but it has been found that in most cases about 150 pounds of lime are sufficient for a 22,000 gallon charge. The ester containing the suspended lime or other neutralizing agent is then pumped, preferably while still hot, back to the kettle, where the hot reaction mixture is practically completely neutralized in from ten to thirty minutes.

Dry slacked lime may be added directly to the kettle, but this process has been found to be unsatisfactory due to the tendency for lumps of solid material to be deposited in the bottom of the kettle at the place of entry, and due to the difficulty of dropping, pumping, or pressing lime into the kettle during the distillation without the loss of time or heat in the distillation. It is preferred, then, to add the neutralizing agent in the form of a suspension in an organic liquid. The suspension may be made in a portion of the substantially dry reaction mixture, in substantially dry butanol, substantially dry butyl acetate, or in a substantially dry mixture of butanol and butyl acetate. Of course, if an ester other than butyl acetate is being prepared, the alcohol being used, the ester being formed, or a mixture of the two may be used in place of the butanol and butyl acetate.

Regardless of the fact that a dry suspension is used, water will be present in every case after neutralization, due to the formation of water in the reaction. This water is eliminated from the system by the same continuous distillation and separation process as was used during the esterification. When the neutral ester is substantially dry, the final distillation may be effected directly from the reaction kettle. The slop remaining in the kettle is of such a physical character that it may be washed out very quickly and easily. The calcium sulphate being insoluble may be separated by filtration, if desired, and the calcium acetate recovered by any of the known means.

Thus it is seen that a cheap neutralizing agent may be used, that dual equipment is unnecessary, and that a saving of time, heat, and power results from the use of the present improved process. It is to be distinctly understood, however, that this invention is not to be limited to the specific details of the above example. The method is applicable to all similar esterification processes, and is to be taken to include all the usual equivalents and modifications which would occur to one skilled in the art. For example, the process might be used in the esterification of propionic acid and butanol, or butyric acid and butanol. The catalyst might be omitted entirely, or other catalysts such as hydrochloric acid, or an organic acid such as formic might be used. Although lime is eminently satisfactory as the neutralizing agent in this process from the viewpoints of both cost and efficiency, other alkaline materials may be employed, as for example, caustic baryta, soda ash, or calcite.

What is claimed is:

1. In a process for the manufacture of esters by the direct esterification of a free aliphatic carboxylic acid, the step which comprises neutralizing the reaction mixture with a non-aqueous suspension of lime on the completion of the esterification, said neutralization being carried out in the esterification kettle while the reaction mixture is still hot.

2. In a process for the manufacture of esters by the direct esterification of a free aliphatic carboxylic acid, the steps which comprise removing a fraction of the reaction mixture on the completion of the esterification, suspending in said fraction sufficient alkaline material, chosen from the group consisting of alkaline compounds of alkali metals and alkaline earth metals, to neutralize the free acid remaining in the total mixture, and returning said fraction and the alkaline material suspended therein to the remainder of the reaction mixture, said operation being carried out before a substantial amount of heat is lost from the reaction mixture.

3. In a process for the manufacture of esters by the direct esterification of a free aliphatic carboxylic acid, the step which comprises adding to the reaction mixture, on the completion of the esterification, a suspension of an alkaline material, chosen from the group consisting of alkaline compounds of alkali metals and alkaline earth metals, in a substantially dry organic liquid selected from the group consisting of the alcohol being used, the ester being formed, and a mixture of the alcohol and ester, said alkaline material being sufficient in amount to neutralize the free acid remaining in the reaction mixture, and said operation being carried out before a substantial amount of heat is lost from the reaction mixture.

4. In a process for the manufacture of esters by the direct esterification of a free aliphatic carboxylic acid, the steps which comprise removing a fraction of the reaction mixture on the completion of the esterification, suspending in said fraction sufficient alkaline material, chosen from the group consisting of alkaline compounds of alkali metals and alkaline earth metals, to neutralize the free acid remaining in the total mixture, returning said fraction and the alkaline material suspended therein, while said fraction is still hot, to the remainder of the reaction mixture, carrying out said operation before a substantial amount of heat is lost from the reaction mixture, and subsequently recovering the products.

5. In a process for the manufacture of esters by the direct esterification of a free aliphatic carboxylic acid, the steps which comprise removing approximately 1.5% of the reaction mixture on the completion of the esterification, suspending in said fraction sufficient alkaline material, chosen from the group consisting of alkaline compounds of alkali metals and alkaline earth metals, to neutralize the free acid remaining in the total mixture, returning said fraction and the alkaline material suspended therein, while said fraction is still hot, to the remainder of the reaction mixture, carrying out said operation before a substantial amount of heat is lost from the reaction mixture, and subsequently recovering the products.

6. In a process for the manufacture of esters, the steps which comprise heating together approximately equivalent proportions of an aliphatic acid and an aliphatic alcohol, removing substantially all the water present in the mixture and the water formed in the esterification, said operation being accomplished by a continuous distillation and separation of the water layer, removing a fraction of the reaction mixture on the completion of the esterification, suspending in said fraction of the reaction mixture sufficient of an alkaline material, chosen from the group consisting of alkaline compounds of alkali metals and alkaline earth metals, to neutralize the free acid remaining in the total mixture, returning said fraction and the alkaline material suspended therein, while said fraction is still hot, to the remainder of the reaction mixture, carrying out said steps before a substantial amount of heat is lost from the reaction mixture, and subsequently recovering the products.

7. In a process for the manufacture of esters, the steps which comprise heating together in the presence of a catalyst approximately equivalent proportions of an aliphatic acid and an aliphatic alcohol, removing substantially all the water present in the mixture and the water formed in the esterification, said operation being accomplished by a continuous distillation and separation of the water layer, removing a fraction of the reaction mixture on the completion of the esterification, suspending in said fraction of the reaction mixture sufficient of an alkaline material, chosen from the group consisting of alkaline compounds of alkali metals and alkaline earth metals, to neutralize the free acid remaining in the total mixture, returning said fraction and the alkaline material suspended therein, while said fraction is still hot, to the remainder of the reaction mixture, carrying out said steps before a substantial amount of heat is lost from the reaction mixture.

8. In a process for the manufacture of esters, the steps which comprise heating together in the presence of substantially 0.1% sulphuric acid, approximately equivalent proportions of an aliphatic acid and an aliphatic alcohol, removing substantially all the water present in the mixture and the water formed in the esterification, said operation being accomplished by a continuous distillation and separation of the water layer, removing approximately 1.5% of the reaction mixture on the completion of the esterification, suspending in said fraction of the reaction mixture sufficient of an alkaline material, chosen from the group consisting of alkaline compounds of alkali metals and alkaline earth metals, to neutralize the free acid remaining in the total mixture, returning said fraction and the alkaline material suspended therein, while said fraction is still hot, to the remainder of the reaction mixture, carrying out said steps before a substantial amount of heat is lost from the reaction mixture, and subsequently recovering the products.

9. In a process for the manufacture of butyl acetate by the esterification of acetic acid and butanol, the steps which comprise removing a fraction of the reaction mixture on the completion of the esterification, suspending in said fraction sufficient alkaline material, chosen from the group consisting of alkaline compounds of alkali metals and alkaline earth metals, to neutralize the free acid remaining in the total mixture, and returning said fraction and the alkaline material suspended therein to the remainder of the reaction mixture, said operation being carried out before a substantial amount of heat is lost from the reaction mixture.

10. In a process for the manufacture of butyl acetate by the esterification of acetic acid and butanol, the step which comprises adding to the reaction mixture, on the completion of the esterification, a suspension of an alkaline material, chosen from the group consisting of alkaline compounds of alkali metals and alkaline earth metals, in a substantially dry organic liquid selected from the group consisting of butanol, butyl acetate, and a mixture of butanol and butyl acetate, said alkaline material being sufficient in amount to neutralize the free acid remaining in the reaction mixture, and said operation being carried out before a substantial amount of heat is lost from the reaction mixture.

11. In a process for the manufacture of butyl acetate by the esterification of acetic acid and butanol, the steps which comprise removing a fraction of the reaction mixture on the completion of the esterification, suspending in said fraction sufficient alkaline material, chosen from the group consisting of alkaline compounds of alkali metals and alkaline earth metals, to neutralize the free acid remaining in the total mixture, returning said fraction and the alkaline suspended therein, while said fraction is still hot, to the remainder of the reaction mixture, carrying out said operation before a substantial amount of heat is lost from the reaction mixture, and subsequently recovering the products.

12. In a process for the manufacture of butyl acetate by the esterification of acetic acid and butanol, the steps which comprise removing approximately 1.5% of the reaction mixture on the completion of the esterification, suspending in said fraction sufficient alkaline material, chosen from the group consisting of alkaline compounds of alkali metals and alkaline earth metals, to neutralize the free acid remaining in the total mixture, returning said fraction and the alkaline material suspended therein, while said fraction is still hot, to the remainder of the reaction mixture, carrying out said operation before a substantial amount of heat is lost from the reaction mixture, and subsequently recovering the products.

13. In a process for the manufacture of butyl acetate, the steps which comprise heating together approximately equivalent proportions of acetic acid and butanol, removing substantially all the water present in the mixture and the water formed in the esterification, said operation being accomplished by a continuous distillation and separation of the water layer, removing a fraction of the reaction mixture on the completion of the esterification, suspending in said fraction of the reaction mixture sufficient of an alkaline material, chosen from the group consisting of alkaline compounds of alkali metals and alkaline earth metals, to neutralize the free acid remaining in the total mixture, returning said fraction and the alkaline material suspended therein, while said fraction is still hot, to the remainder of the reaction mixture, carrying out said steps before a substantial amount of heat is lost from the reaction mixture, and subsequently recovering the products.

14. In a process for the manufacture of butyl acetate, the steps which comprise heating together in the presence of a catalyst approximately equivalent proportions of acetic acid and butanol, removing substantially all the water present in the mixture and the water formed in the esterification, said operation being accomplished by a continuous distillation and separation of the water layer, removing a fraction of the reaction mixture on the completion of the esterification, suspending in said fraction of the reaction mixture sufficient of an alkaline material, chosen from the group consisting of alkaline compounds of alkali metals and alkaline earth metals, to neutralize the free acid remaining in the total mixture, returning said fraction and the alkaline material suspended therein, while said fraction is still hot, to the remainder of the reaction mixture, carrying out said steps before a substantial amount of heat is lost from the reaction mixture, and subsequently recovering the products.

15. In a process for the manufacture of esters by the direct esterification of a free aliphatic acid with an aliphatic alcohol, the step which comprises neutralizing the reaction mixture with a non-aqueous suspension of lime on the completion of the esterification, said neutralization being carried out in the esterification kettle while the reaction mixture is still hot.

16. In a process for the manufacture of butyl acetate by the esterification of acetic acid with butanol, the step which comprises neutralizing the reaction mixture with a non-aqueous suspension of lime on the completion of the esterification, said neutralization being carried out in the esterification kettle while the reaction mixture is still hot.

17. In a process for the manufacture of esters by the direct esterification of a free aliphatic carboxylic acid, the step which comprises neutralizing the reaction mixture on the completion of the esterification with an alkaline material selected from the group consisting of alkaline compounds of alkali metals and alkaline earth metals, said alkaline material being suspended in a substantially dry organic liquid selected from the group consisting of the alcohol being used, the ester being formed, and a mixture of the alcohol and ester, neutralization being carried out in the esterification kettle while the reaction mixture is still hot.

In testimony whereof we affix our signatures.

CLARENCE W. HANCOCK.
EDWIN H. CARNARIUS.